R. HUTTON.
Belt-Guides for Paper-Machines.
No. 140,418.            Patented July 1, 1873.
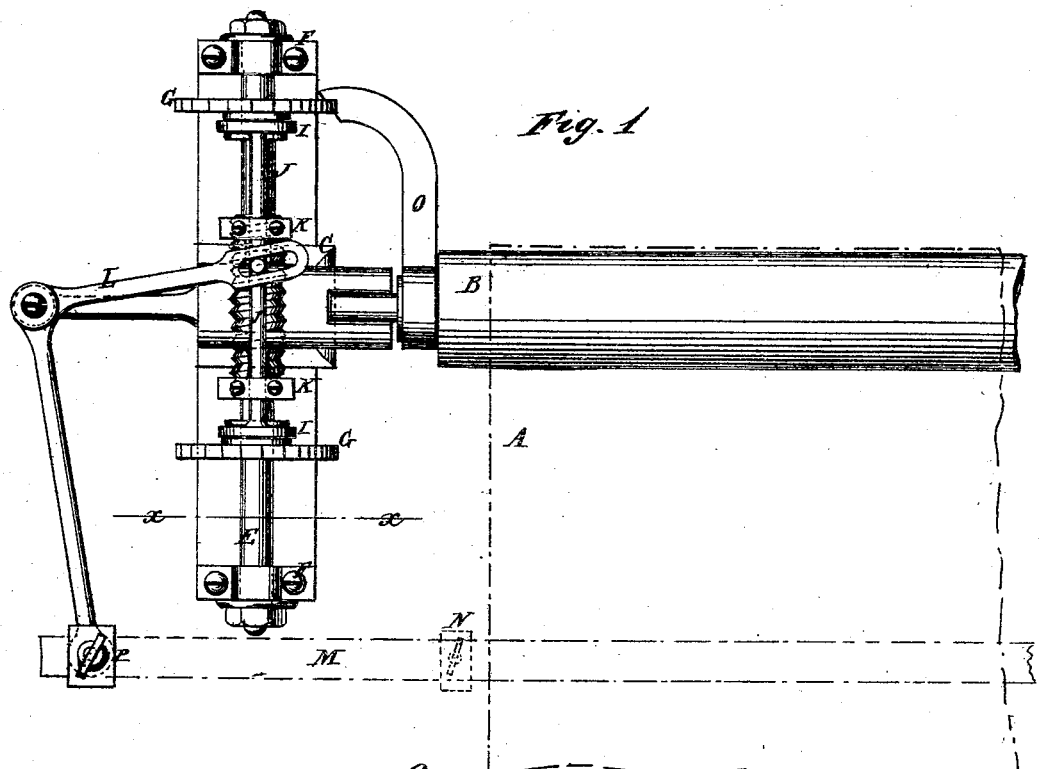
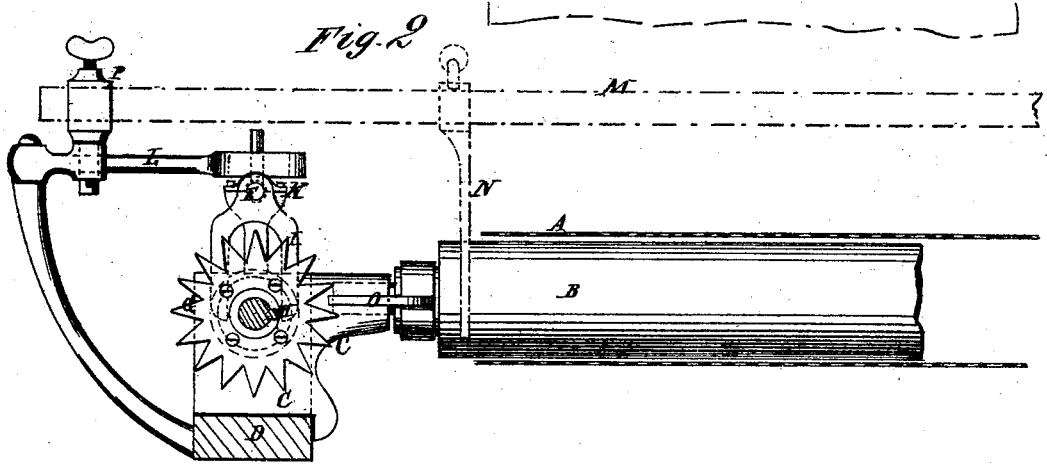

UNITED STATES PATENT OFFICE

ROBERT HUTTON, OF HOLYOKE, MASSACHUSETTS.

IMPROVEMENT IN BELT-GUIDES FOR PAPER-MACHINES.

Specification forming part of Letters Patent No. 140,418, dated July 1, 1873; application filed April 26, 1873.

*To all whom it may concern:*

Be it known that I, ROBERT HUTTON, of Holyoke, in the county of Hampden and State of Massachusetts, have invented a new and Improved Belt-Guide for Paper-Machine, of which the following is a specification:

The endless-wire belt-carriers of paper-making machinery are very difficult to keep in the true course on the rollers over which they are carried, owing to the variations of the tension caused by the shifting of the wires, and they cannot be kept in place by having the edges run against stationary guides because the wires bend and double over at the edges and wear out rapidly.

I propose, therefore, to have one of the bearings of one of the rollers arranged so that it can be shifted, so as to vary the tension at the edges of the belt, and provide mechanism in connection therewith, whereby the belt itself will cause the bearing to be shifted automatically whenever it runs out of its true course so as to correct it.

Figure 1 is a plan view of part of the belt, one of the carrier-rollers for it, the roller bearings, and the apparatus I use for automatically guiding the belt; and Fig. 2 is a sectional elevation of Fig. 1 taken on the line x x.

A represents part of the endless carrier-belt, of wire; B, one of the carrier-belt rollers; C, the bearing for it; D, the support for the bearing, which is arranged on it so as to slide forward and back parallel with the lengthwise direction of the belt and at right angles with the roller. E is a rod or shaft arranged to revolve in the uprights F on the support D on opposite sides of the journal-bearing C. Said rod passes through the bearing and is screw-threaded therein to move it when revolved to shift the roller for varying the tension of the edges of the belt. G represents a star-wheel splined on the smooth part of the shaft by a rib, H, so that it can slide freely endwise on it, but cannot turn without turning the shaft. They are arranged on opposite sides of the bearing C, and are connected together by the crotches I and rod J, the latter being supported in the standards K, so that it can slide endwise freely. This rod J is connected by the bell-crank L with the rod M, (shown dotted,) which extends across the belt above it parallel with the roller B, and has a plate, N, projecting down by each edge of the belt. O is a blade of metal fitted on the roller B next to the bearing C to revolve with the roller, and by coming in contact with the points of the star-wheels turn them. The bar M is supported at one end in the end of one arm of the bell-crank by the swiveled socket-piece P, and at the other end in any way that will allow the belt to move it endwise whenever one of the edges touches and bears against one of the plates N.

Supposing the tension to be greatest on the left-hand side of the belt, by which it would be caused to run to the left and come in contact with the plate N and move the bar in the same direction, the bell-crank would be shifted thereby, so as to move the wheels G toward the front, so that the blade O would act on the front wheel and turn it so that the screw-shaft E would draw the bearing C toward the front, which would lessen the tension on the left-hand side of the belt and prevent it from running in that direction. If the tension be greatest on the right-hand edge of the belt the shaft E would be shifted in the other direction, so that the blade would act on the other star-wheel and cause the screw to move the bearing in the other direction.

It is to be noted that the lateral movement of the belt is always toward the side where the tension is greatest.

Having thus described my invention, I claim as new and desire to secure by Letters Patent—

The combination, in an automatic wire-belt adjusting apparatus, of the following instrumentalities: A sliding journal-bearing, C, propelling-screw E, actuating star-wheels G, bell-crank L, shifting-bar M, plates N, and a revolving blade, O, when arranged in connection with the belt and one of the rollers, substantially in the manner described.

ROBERT HUTTON.

Witnesses:
MATHEW WALSH,
CHAS. C. JENKS.